US012459278B2

(12) United States Patent
Tse et al.

(10) Patent No.: US 12,459,278 B2
(45) Date of Patent: Nov. 4, 2025

(54) ELECTROHYDRODYNAMIC PRINTER WITH SELF-CLEANING EXTRACTOR

(71) Applicant: The Regents of the University of Michigan, Ann Arbor, MI (US)

(72) Inventors: Lai Yu Leo Tse, Ann Arbor, MI (US); Kira Barton, Ann Arbor, MI (US); Ethan John McMillan, Grand Haven, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 205 days.

(21) Appl. No.: 18/011,509

(22) PCT Filed: Jun. 18, 2021

(86) PCT No.: PCT/US2021/038106

§ 371 (c)(1),
(2) Date: Dec. 19, 2022

(87) PCT Pub. No.: WO2021/258001

PCT Pub. Date: Dec. 23, 2021

(65) Prior Publication Data

US 2023/0256758 A1 Aug. 17, 2023

Related U.S. Application Data

(60) Provisional application No. 63/041,586, filed on Jun. 19, 2020.

(51) Int. Cl.

*B41J 29/17* (2006.01)
*B41J 2/02* (2006.01)

(Continued)

(52) U.S. Cl.

CPC ................ *B41J 29/17* (2013.01); *B41J 2/06* (2013.01); *B41J 2/075* (2013.01); *B41J 2/09* (2013.01);

(Continued)

(58) Field of Classification Search

CPC ....... B41J 2/075; B41J 2/02; B41J 2/07; B41J 2/09; B41J 2/105; B41J 2002/022; B41J 2002/031

See application file for complete search history.

(56) References Cited

U.S. PATENT DOCUMENTS

| | | | |
|---|---|---|---|
| 6,588,888 | B2 | 7/2003 | Jeanmaire et al. |
| 6,848,766 | B2 | 2/2005 | Garbacz et al. |

(Continued)

FOREIGN PATENT DOCUMENTS

| | | | |
|---|---|---|---|
| EP | 2714405 | A1 | 4/2014 |
| JP | S55-086770 | A | 6/1980 |

(Continued)

OTHER PUBLICATIONS

International Search Report corresponding to PCT/US2021/038106, Sep. 28, 2021, 3 pages.

(Continued)

*Primary Examiner* — Geoffrey S Mruk
(74) *Attorney, Agent, or Firm* — Reising Ethington P.C.

(57) ABSTRACT

An electrohydrodynamic printer has a self-cleaning extractor that can cleaning itself during printing. The extractor can be in the form of a metal block or a metal rod along which a layer of cleaning fluid flows from a source of cleaning fluid to a collector. The surface of the extractor along which the cleaning fluid flows can be adjustable between horizontal and any other angle. The self-cleaning extractor eliminates the need to interrupt e-jet printing cycles to clean stray (Continued)

printing fluid from the extractor by continuously keeping the extractor clean during ink extraction and printing.

19 Claims, 3 Drawing Sheets

(51) Int. Cl.
*B41J 2/06* (2006.01)
*B41J 2/075* (2006.01)
*B41J 2/09* (2006.01)
*B41J 2/03* (2006.01)

(52) U.S. Cl.
CPC .... *B41J 2002/022* (2013.01); *B41J 2002/031* (2013.01)

(56) References Cited

U.S. PATENT DOCUMENTS

| | | | | |
|---|---|---|---|---|
| 7,520,598 | B2 * | 4/2009 | Xu | B41J 2/1707 347/77 |
| 7,938,516 | B2 * | 5/2011 | Piatt | B41J 2/09 347/73 |
| 8,398,221 | B2 | 3/2013 | Xie | |
| 2003/0016264 | A1 | 1/2003 | Jeanmaire | |
| 2003/0016276 | A1 | 1/2003 | Jeanmaire | |
| 2004/0017421 | A1 | 1/2004 | Jeanmaire | |
| 2004/0070645 | A1 | 4/2004 | Garbacz et al. | |
| 2006/0119669 | A1 | 6/2006 | Sharma et al. | |
| 2010/0033543 | A1 | 2/2010 | Piatt et al. | |
| 2010/0149238 | A1 | 6/2010 | Garbacz | |
| 2018/0281419 | A1 | 10/2018 | Clippingdale et al. | |

FOREIGN PATENT DOCUMENTS

| | | | |
|---|---|---|---|
| JP | 2003089214 | A | 3/2003 |
| JP | 2004130804 | A | 4/2004 |
| JP | 2007190728 | A | 8/2007 |
| JP | 2010526687 | A | 8/2010 |
| JP | 2014515326 | A | 6/2014 |
| JP | 2018012323 | A | 1/2018 |
| KR | 20180048667 | A | 5/2018 |
| KR | 20190054305 | A | 5/2019 |
| WO | 2012162354 | A1 | 11/2012 |

OTHER PUBLICATIONS

Written Opinion corresponding to PCT/US2021/038106, Sep. 28, 2021, 5 pages.
English summary of Japanese Office Action corresponding to application 2022-578721, dated Dec. 26, 2023, 2 pages.
European Search Report in corresponding EP application 21826612.0, dated May 29, 2024, 8 pages.
English summary of Notice of Grounds of Rejection in corresponding Japanese application 2022-578721, dated Jul. 2, 2024, 2 pages.
English summary of Korean Office Action corresponding to application 10-2023-7002185, dated Sep. 20, 2024, 5 pages.

* cited by examiner

ELECTROHYDRODYNAMIC PRINTER WITH SELF-CLEANING EXTRACTOR

TECHNICAL FIELD

The present disclosure relates generally to printing and, more particularly, to electrohydrodynamic printing.

BACKGROUND

Electrohydrodynamic printing, also known as e-jet printing, is a printing technique that relies on an electric field to extract a charged or polarized printing fluid from a printing nozzle for deposition on a printing surface. E-jet printing is capable of very high-resolution printing compared to other drop-on-demand or stream printing methods with droplet size and spatial accuracy on a sub-micron or nanometer scale. Early e-jet printing was limited to electrically conductive printing surfaces because the printing surface was one of the electrodes between which the electric field was produced. Consistency with the electric field was also problematic due to the deposited ink causing interference with the field as printing progressed. U.S. Pat. No. 9,415,590 to Barton, et al. addressed these and other problems via clever ink extraction and directing techniques that did not rely on a conductive printing surface.

SUMMARY

In accordance with various embodiments, an electrohydrodynamic printer includes a self-cleaning extractor.

In various embodiments, the extractor comprises a metal block.

In various embodiments, the extractor is a metal rod.

In various embodiments, the printer is configured so that a layer of cleaning fluid flows along a surface of the extractor.

In various embodiments:

- the cleaning fluid is a liquid,
- the surface forms a non-zero angle with respect to horizontal such that the layer of cleaning fluid flows downward and away from a working end of the extractor,
- an angle of the surface with respect to horizontal is adjustable,
- the surface is a downward facing surface, and/or
- the printer includes a source of cleaning fluid and a collector, wherein the layer of cleaning fluid flows from the source to the collector.

In various embodiments, the printer includes a gas-over-liquid dispensing system that dispenses a layer of cleaning fluid on the extractor.

In accordance with various embodiments, a method includes the step of cleaning an extractor of an electrohydrodynamic printer during printing.

In various embodiments, the extractor being cleaned includes a metal block or a metal rod.

In various embodiments, the method includes the step of causing a layer of cleaning fluid to flow along a surface of the extractor.

In various embodiments:

- the cleaning fluid caused to flow along the surface of the extractor is a liquid,
- the surface forms a non-zero angle with respect to horizontal such that the layer of cleaning fluid flows downward and away from a working end of the extractor,

- an angle of the surface with respect to horizontal is adjustable, and/or
- the surface is a downward facing surface.

In various embodiments, the layer of cleaning fluid flows along a surface of the extractor from a source to a collector.

In various embodiments, the method includes the step of dispensing cleaning fluid on the extractor using a gas-over-liquid dispensing system.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF EMBODIMENTS

Figure 1:
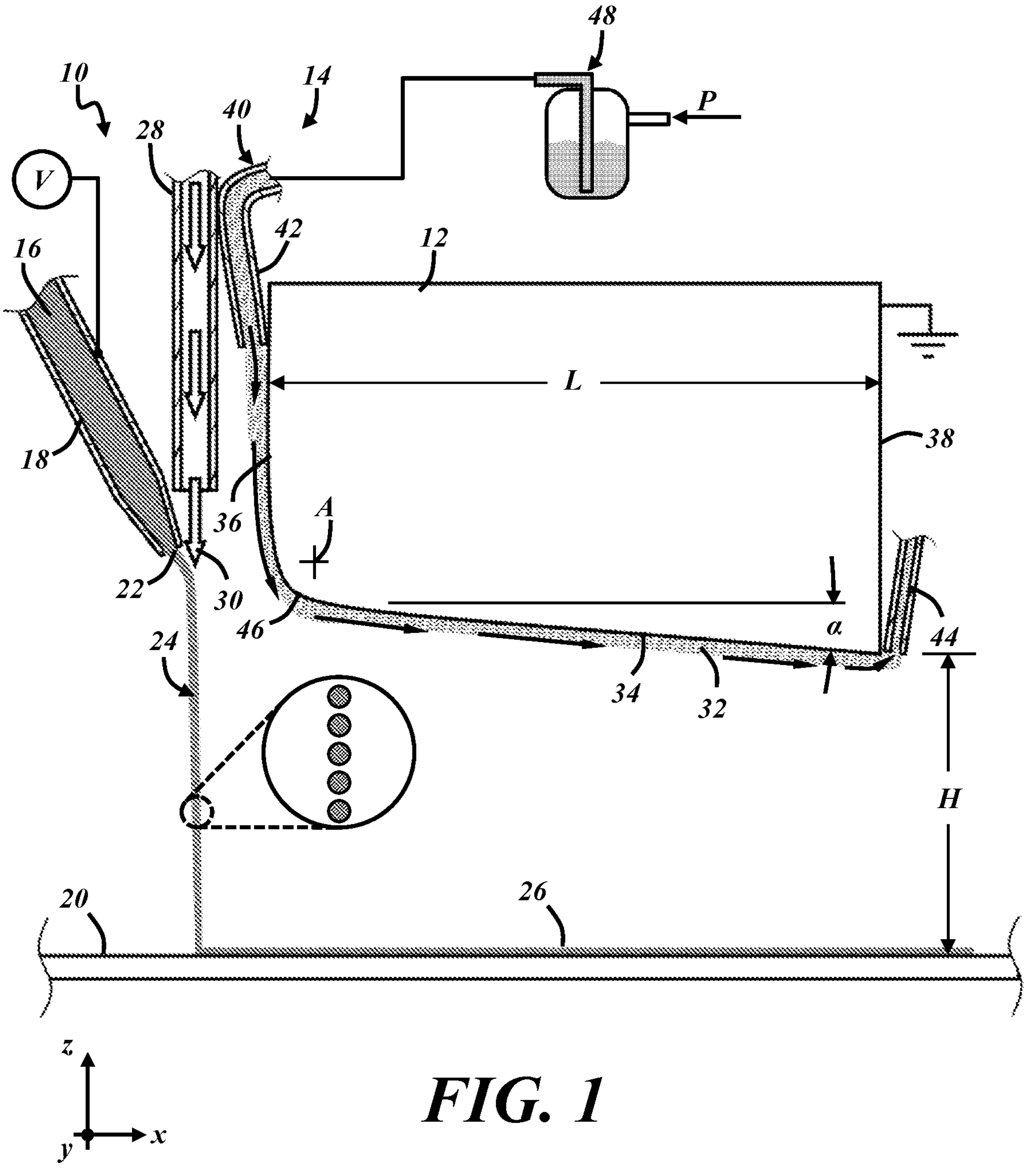
FIG. 1 is a partial cross-sectional side view schematically illustrating a portion of an electrohydrodynamic printer with a self-cleaning extractor formed from a metal block.

FIG. 1 schematically illustrates a portion of an electrohydrodynamic (or e-jet) printer 10 equipped with a self-cleaning extractor 12. The extractor 12 is part of a print head 14 configured to use a controllable electric field to extract printing fluid 16 from an ink nozzle 18 and to direct the extracted printing fluid toward a printing surface 20, such as a substrate surface or a previously printed layer of material. The electric field is generated in a space between the nozzle 18 and the extractor 12 when they are at different electrical potentials. In this example, a voltage (V) is selectively applied to the nozzle 18, resulting in a voltage potential across the nozzle and the extractor 12, which is at electrical ground in FIG. 1. When the voltage potential is sufficiently high and the distance between the nozzle 18 and the extractor 12 is sufficiently low, the electric field is generated.

The printing fluid 16 takes the charge of the nozzle 18 in which it is contained and is therefore drawn toward the other end of the generate electric field—i.e., toward the extractor 12. The printing fluid 16 deforms and flows toward the extractor at the path of least resistance, which is at a discharge opening 22 of the nozzle 18, through which the printing fluid is extracted as a stream 24 of printing fluid. As used herein, an ink or printing fluid is any fluid that flows under pressure and can be solidified after deposition. Solidification can be via various mechanisms, such as solvent evaporation, chemical reaction, cooling, or sintering. In some cases, the printing fluid is a functional ink, which is a printing fluid that provides a function other than coloration once solidified on the surface on which it is printed. Examples of such functions include electrical conductivity, dielectric properties, physical structure (e.g., stiffness, elasticity, or abrasion resistance), electromagnetic shielding or filtering, optical properties, electroluminescence, etc.

Depending on several factors, such as the amplitude of the voltage (V), the voltage (V) as a function of time, the viscosity of the printing fluid 16, etc., the stream 24 of printing fluid may be a continuous jet of printing fluid or a series of individual droplets, as shown in the inset of FIG. 1. For example, if the applied voltage (V) is an AC voltage or a pulsed DC voltage, the stream 24 of printing fluid may be composed of individual droplets. In some cases, such as with high viscosity printing fluids, the stream 24 may be cohesive such that individual droplets are not discernable, even when the voltage is alternating or pulsed. As the print head 14 and printing surface 20 move relative to each other, a pattern 26 of deposited printing fluid can be controlled and defined by coordination of the voltage (V) function with the location of the print head relative to the printing surface. The voltage (V) may have a baseline range from 10V to 300V (e.g., 200-300V) within which the generated field is sufficient to maintain a Taylor cone of printing fluid at the nozzle tip but insufficient for extraction. The extraction voltage (V) may range from 300V to 1000V (e.g., 400-700V). These are of course only exemplary ranges.

The illustrated print head 14 also employs a directionality field to direct the extracted printing fluid toward the printing surface 20. In this case, the directionality field is a gas flow field generated between a director nozzle 28 and the printing surface 20. The gas flow field is generated by a jet of gas 30 discharged from the nozzle 28 in the direction of the printing surface 20. Other types of directionality fields are possible, such as electrostatic directionality fields as disclosed in the above-mentioned U.S. Patent to Barton et al.

The printer 10 may of course include other components not illustrated in the figures, such as a base, a movement mechanism for moving the print head 14 and printing surface 20 relative to each other, multiple ink nozzles 18 or extractors 12 or directionality field generators, on-board ink sources, means for pressurizing the printing fluid 16 in the nozzle(s), pneumatic or other gas connectors, pressure controllers for the printing fluid and/or jets of gas 30, or one or more power supplies and associated controllers to selectively generate the extraction field, to name a few examples. It should also be understood that the illustrated extractor-nozzle-director combination is merely exemplary and that the self-cleaning function discussed below can be employed with any e-jet extractor.

As used herein, a self-cleaning extractor is any extractor of an electrohydrodynamic print head, where the print head includes one or more components configured to clean printing fluid from a surface of the extractor. Such components are an integral part of the print head 14 and move with the print head during printer operation, for example. Accordingly, the printer 10 or print head 14 do not have to be disassembled to clean stray printing fluid from the extractor 12. In some embodiments, the extractor 12 is cleaned and remains substantially clean during printing, even when stray printing fluid is on a trajectory toward the extractor. Indeed, as will become clear from the following description, the self-cleaning function may operate to intercept stray printing fluid and carry it away from the extractor 12 before the stray fluid contacts the extractor.

In the example of FIG. 1, the printer 10 is configured so that a layer of cleaning fluid 32 flows along a surface 34 of the extractor 12. The illustrated extractor 12 is elongated in a direction away from the nozzle 18 (the x-direction of FIG. 1). The cleaning fluid 32 is a liquid, such as a an organic solvent (e.g., acetone or an alcohol) in which the printing fluid 16 is soluble, and the layer of cleaning fluid flows from a working end 36 of the extractor 12, nearest the nozzle 18, toward an opposite end 38, away from the nozzle.

A cleaning system 40 of the print head 14 may include a source 42 of cleaning fluid and a collector 44. In the example of FIG. 1, the source 42 is a dispenser in the form of a nozzle, and the collector 44 is a collection tube. The dispenser 42 is located at the working end 36 of the extractor 12, and the collector 44 is located at the opposite end 38 of the extractor. The cleaning fluid 32 flows from an outlet end of the dispenser 42 and onto the outer surface 34 of the extractor. In this case, the cleaning fluid 32 is dispensed along a generally vertical portion of the extractor surface 34 and follows the surface downward, then along a bend 46 to a downward facing portion of the surface that leads the layer of cleaning fluid away from the working end 36 to the collector 44, where the cleaning fluid and any printing fluid captured by the cleaning fluid is drawn into the collector by a vacuum, for example.

The layer of cleaning fluid 32 is exposed to the atmosphere along at least a portion of the extractor surface 34 which in this case is the portion of the surface 34 between the dispenser 42 and the collector 44. Where exposed to the atmosphere, the layer of cleaning fluid 32 is unsupported by additional printer components and remains attached to the extractor surface 34 against the force of gravity via cohesive forces of the cleaning fluid (e.g., surface tension, viscosity, etc.). The downward facing portion of the surface 34 is at a non-zero angle (a) with respect to horizontal to cause the cleaning fluid to flow in the desired direction away from the working end 36 of the extractor 12. In the example of FIG. 1, the angle (a) is about 5 degrees. This angle (a) may have a limited operable range. If the angle (a) is too small, then the cleaning fluid 32 may not flow in the desired direction. If the angle (a) is too large, then the resulting flow rate of the layer of cleaning fluid may be too high for the collector 44 to capture. Also, the larger the angle (a), the smaller the available distance (H) between the print head 14 and the printing surface 20 for a given length (L) of the extractor 12; or the smaller the available length (L) for a given distance (H) from the printing surface. The collector 44 may need to be spaced some minimum distance from the nozzle 18, for example, to avoid unwanted effects on the trajectory of the stream 24 of printing fluid.

The printer 10 may be configured so that the angle (a) is adjustable. For instance, the extractor 12 may be mounted to a structural component of the print head so that it can rotate about a horizontal axis (A) and to adjust and fix the orientation of the surface 34. Here, the rotational axis (A) is near the working end 36 of the extractor 12 and near the bottom of the extractor to minimize changes in distance between the nozzle 18 and extractor when the angle (a) is changed. The optimum angle (a) may vary based at least on the viscosity of the cleaning fluid 32 and the surface energy and shape of the extractor surface 34. In this example, the downward facing portion of the surface 34 between the bend 46 and the opposite end 38 of the extractor is planar. In other examples, the surface 34 may include a groove or be gradually curved with a changing angle (a) as a function of length (L).

The cleaning system 40 may also be configured to control the flow rate of cleaning fluid 32 from the dispenser 42. If the flow rate is too high, then the layer of cleaning fluid 32 may become unstable and drip onto the printing surface 20, particularly near the bend 46 along the surface 34. If the flow rate is too low, the extractor 12 may not be sufficiently cleaned. The stability or consistency of the flow rate of cleaning fluid is also important. It has been found that a gas-over-liquid dispensing system 48 is particularly suitable in the embodiment of FIG. 1. A portion of such a system 48 is illustrated schematically in FIG. 1 as a pressure vessel partly filled with the cleaning fluid 32, where a lower portion of the vessel is in fluidic communication with the dispensing nozzle 42. The gas (e.g., air) in the space over the cleaning fluid in the pressure vessel is pressurized, and this pressure (P) is regulated to control the flow rate of cleaning fluid 32 from the dispensing nozzle 42. This type of dispensing system 48 can provide a relatively smooth, uniform flow of cleaning fluid compared to a positive displacement pumps which inherently produce a liquid flow with at least some pulsation. Depending on the particular application, a regulated pressure as low as about 5 psi may be suitable.

The source 42 and collector 44 may take other forms and be located elsewhere on opposite sides of a portion of the surface 34 to be cleaned. Generally, the portion of the surface 34 to be cleaned may be the part of the surface nearest the nozzle 18, as this is the part of the extractor 12 most likely to receive stray printing fluid 16. In this example, this corresponds to the bend 46 along which the layer of cleaning fluid 32 flows. In some embodiments, the source 42 and/or the collector may be fluid channels formed in the extractor 12 and opening at different locations on the surface 34. The cleaning system 40 may include other non-illustrated components, such as a cleaning fluid reservoir, a pump, a solvent recirculation system, valves, controllers, or connections to similar external components.

The extractor 12 can also take on multiple forms and is any component that operates as one side of the electric extraction field. Like the nozzle 18, the extractor 12 is preferably metal but may instead have only a layer or a portion of metal or some other electrically conductive material capable of generating an electric field between itself and the nozzle when at a sufficiently different electrical potential. In the example of FIG. 1, the extractor 12 is a metal block (e.g., aluminum or stainless steel), which is a relatively simple and cost-effective construction. In particular, the illustrated extractor is in the form of a plate, meaning that the two visible dimensions (in the x- and z-directions) are significantly larger than the thickness dimension (in the y-direction of FIG. 1). A metal plate having a thickness of about 0.25 inches is one suitable option.

Figure 2:
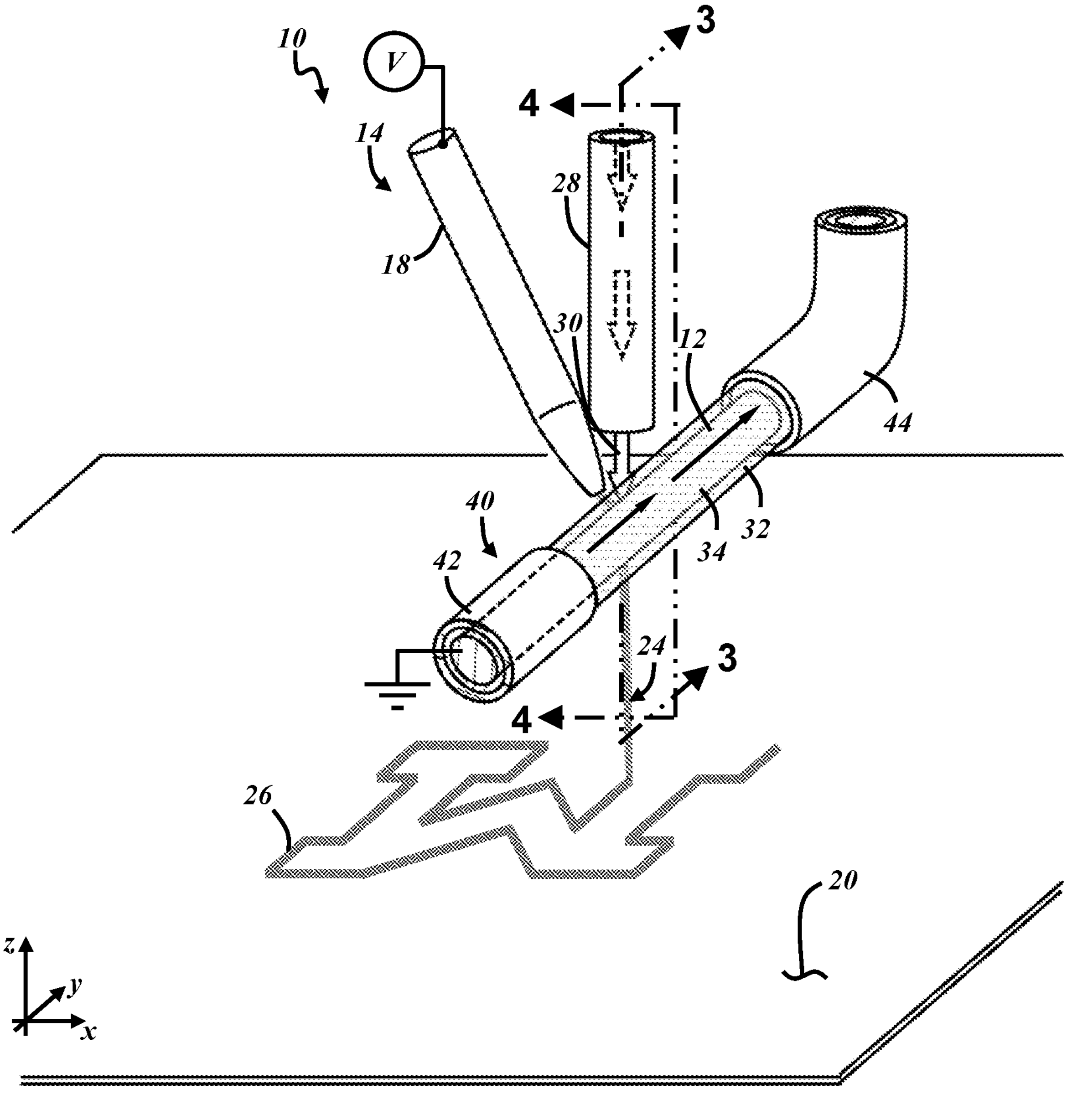
FIG. 2 is a partial cross-sectional isometric view schematically illustrating a portion of an electrohydrodynamic printer with the self-cleaning extractor formed from a metal rod.
Figure 3:
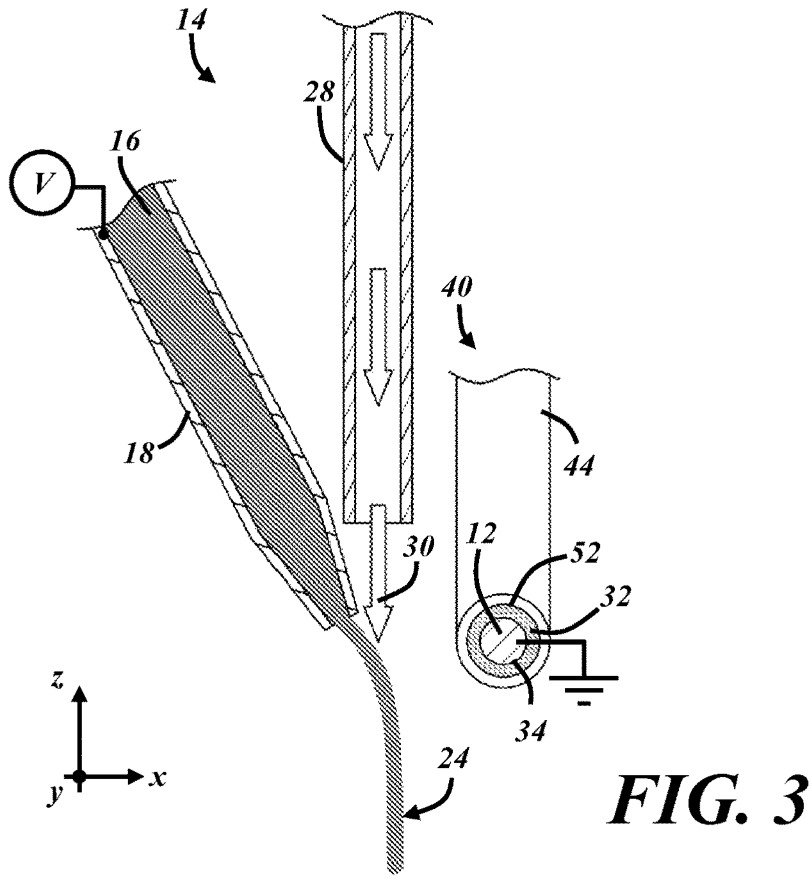
FIG. 3 is a cross-sectional view from FIG. 2 taken across the diameter of the metal rod.
Figure 4:
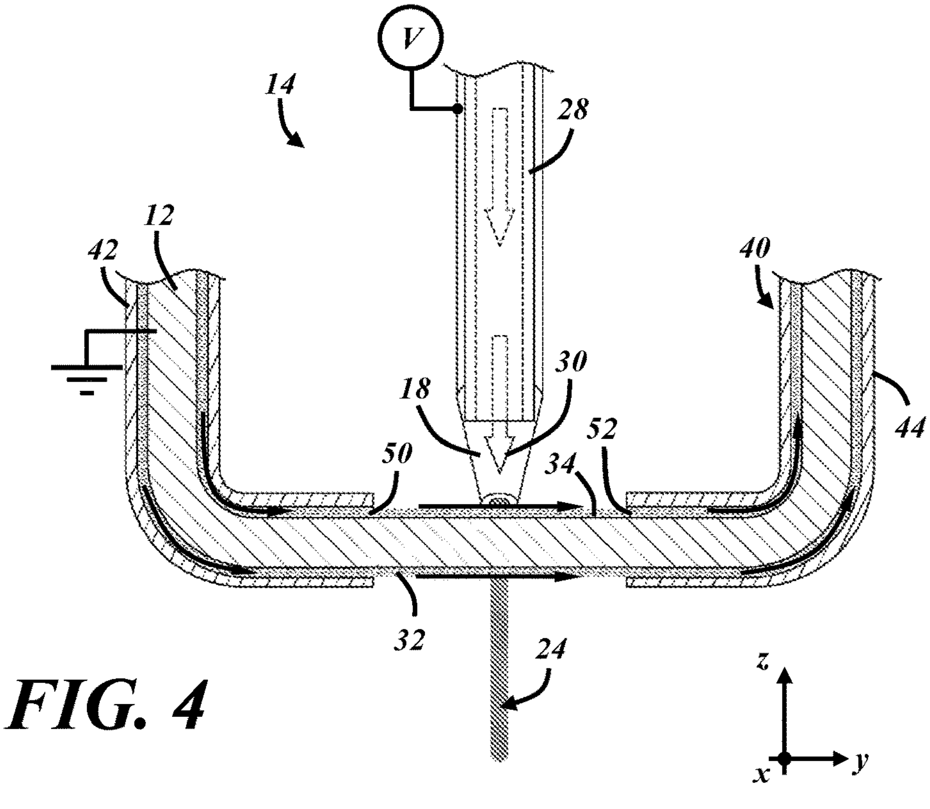
FIG. 4 is a cross-sectional view from FIG. 2 taken along the length of the metal rod.

FIG. 2 schematically illustrates another example of the self-cleaning extractor 12 as part of the printer 10 and print head 14. In this example, the extractor 12 is a metal rod or wire, the working portion of which is horizontal. A rod or wire configuration is characterized by a lengthwise dimension that is significantly larger than its cross-sectional dimensions (e.g., diameter). A metal rod having a diameter of about 0.25 inches is one suitable option. The illustrated portion of the extractor 12 is generally parallel with a plane (the y-z plane of FIG. 2) that is perpendicular to the plane (x-z) in which the ink nozzle 18 and director nozzle 28 are aligned. Additional reference is made below to FIGS. 3 and 4 for clarity. FIG. 3 is a cross-sectional view at an x-z plane through the nozzles 18, 28 and across the diameter of the extractor 12. FIG. 4 is a cross-sectional view at a y-z plane through the length of the extractor 12. Certain printer components corresponding to those of FIG. 1 are labeled with reference numerals in FIGS. 2-4 for convenience in understanding.

The exemplary printer 10 of FIGS. 2-4 operates on the same e-jet principle as that of FIG. 1. An electric extraction field is selectively generated between the extractor 12 and the nozzle 18, and the extracted printing fluid 16 is directed as a stream 30 of printing fluid toward the printing surface 20 in a directionality field generated by a jet of gas 30 from the director nozzle 28. As in FIG. 1, the cleaning system 40 of FIGS. 2-4 is configured so that a layer of cleaning fluid 32 flows along the surface 34 of the extractor 12. The cleaning fluid 32 here is also a liquid (e.g., a solvent), and the layer of cleaning fluid flows from the cleaning fluid source 42 to a collector 44.

In this example, both the source 42 and the collector 44 are tubes into which the extractor 12 extends. In particular, the extractor 12 extends through a dispensing opening 50 of the source 42 and through a collection opening 52 of the collector 44 (FIG. 4). The cleaning fluid 32 flows from the dispensing opening 50 of the source 42 and onto the outer surface 34 of the extractor 12, which is a cylindrical surface in this case. Pressurized cleaning fluid 32 is dispensed along a generally horizontal portion of the extractor 12 and follows the surface 34 to the collector 44, where the cleaning fluid is drawn into the collector by a vacuum, for example. As with the example of FIG. 1, part of the surface 34 along which the cleaning fluid flows is downward facing. More specifically, the entire surface 34 along which the cleaning fluid flows in the example of FIGS. 2-4 is a radially outward facing surface, with the downward facing portion being a lower convex portion of the cylindrical surface.

In the illustrated example, the extractor is generally U-shaped, with the bottom part of the U-shape oriented horizontally and the upright parts of the U-shape residing in the source and collector tubes 42, 44. It has been found that with sufficient pressure in the dispenser 42 and with sufficient vacuum in the collector 44, the surface 34 does not have to be tilted to achieve proper flow of the cleaning fluid. However, a tilt angle may be employed as in the example of FIG. 1, and that angle may be made adjustable.

The layer of cleaning fluid 32 is may thus be in contact with the entire outer surface of the extractor in the illustrated configuration. Within the source and collector tubes 42, 44, the layer of cleaning fluid may have an annular cross-section, as shown in FIG. 3. The exposed portion of the layer of cleaning fluid 32 between the dispenser 42 and the collector 44 may be deformed from its otherwise annular form due to gravity. Where exposed, the layer of cleaning fluid 32 is unsupported by additional printer components and remains attached to the extractor surface 34 against gravity via cohesive forces of the cleaning fluid.

The above-described self-cleaning extractor addresses a problem that has arisen since the advent of using a charged extractor other than a conductive printing surface to generate the extraction field in e-jet printing. Namely, there are times when extracted printing fluid lands on the extractor rather than the printing surface, especially during calibration and initialization cycles of the printer. This can be particularly problematic with certain functional inks, such as conductive inks, which more readily take the charge of the nozzle and are thus more strongly attracted to the extractor. Further, a build-up of conductive ink on the extractor, particularly at the working portion of the extractor nearest the ink nozzle, is problematic because it changes the shape of the extractor, effectively bringing it closer to the nozzle and increasing the risk of arcing across the gap.

Advantageously, the self-cleaning extractor 12 can operate to clean and/or prevent deposition of printing fluid on the extractor surface 34 during normal operation of the printer—i.e., during printing. This can reduce or eliminate the need for separate cleaning cycles between printing cycles and can eliminate the need for disassembly of the print head 14 for cleaning or replacement. A method of e-jet printing may therefore include cleaning the extractor 12 during printing and may further include operation of the above-described cleaning system 40. When electrically conductive printing fluids are used, the method may also include changing the electrical potential of the extractor.

For instance, with a conductive printing fluid, stray droplets of the printing fluid may be attracted to and deposited on the surface 34 of the extractor 12 even when the cleaning fluid 32 is present and flowing along the affected portion of the surface. While the cleaning fluid may clean away the solvent portion of the deposited ink, metallic or conductive solids of the ink may remain on the surface of the extractor. During extraction and deposition of the ink on the printing surface, the extractor may be isolated from ground and from the applied nozzle voltage (V) such that the extractor has a floating electrical potential. This can reduce the risk of arcing posed by the presence of the conductive ink. During a part of the cycle in which no ink is being extracted from the nozzle, the extractor can then be grounded temporarily, which removes the positive charges transferred to the extractor by the stray droplets of printing fluid. Now at the same potential as the extractor, the solids portion of the printing fluid can be cleaned away.

The print head 10 may include a housing 38 in which the illustrated components are at least partly contained. The housing 38 is shown in phantom in FIG. 2. While not shown in detail, skilled artisans will appreciate that fluidic and electrical connections may be provided by the housing 38 to connect the illustrated print head components to fluid and electrical sources outside the housing, including one or more sources of printing fluid, director gas, diverter gas, vacuum, and voltage. The source(s) of printing fluid may have a controllable back pressure which can be brought to zero during printer idle time and into a range from 5 psi to 30 psi (— 35-200 kPa) during operation. Back pressure may be individually controllable at each nozzle to accommodate printing of different fluids from each nozzle. The director gas and diverter gas sources may be the same or different, but at least the diverter gas flow is controllable between on and off conditions corresponding to diverting and non-diverting states, respectively. These on and off conditions of the diverters are individually and independently controllable to permit printed patterns from each different nozzle to be different without independent control of the electrostatic extraction of printing fluid from the nozzles. As such, the independently controllable diverters can entirely define the overall printed pattern while the extractors are all operating under the same voltage input to the ink nozzles. In some cases, the director and diverter gases are the same gas (e.g., air, nitrogen, inert gas, etc.) but are supplied from independent sources.

A baseline voltage with respect to the extractors 22 may be maintained at each ink nozzle 16 to maintain a consistent Taylor cone of polarized printing fluid at the extraction opening 24 of each nozzle. When a sufficiently high voltage (V) is applied to any one or more of the nozzles 16, printing fluid is drawn toward the respective extractor 22 and a droplet of printing fluid is released into the directionality field. Exemplary extraction voltage (V) may range from 300V to 1000V, while the baseline voltage at each nozzle 16 is lower than the respective extraction voltage, such as in a range from 10V to 300V. In various embodiments, the baseline voltage at each electrode 24 ranges from 200V to 300V and/or the extraction voltage ranges from 400V to 700V. While the voltage (V) is illustrated as common to all of the ink nozzles, one nozzle may have a higher extraction voltage than another due to various characteristics of the respective printing fluid in each nozzle, such as viscosity, solids content, electrical conductivity, and polarizability, for example. In some embodiments, a pulse function of the voltage at each nozzle is the same with respect to time, but the extraction voltages are different.

FIGS. 3 and 4 are cross-sectional views of the print head 10 illustrating operation of the diverters. In FIG. 3, first and second streams 20, 20' of printing fluid are being extracted from respective first and second ink nozzles 16, 16' in two different directions toward respective first and second extractors 22, 22' and directed toward the printing surface by jets of gas 28, 28' emitted from the first and second director nozzles 26, 26'. The same is true for third and fourth streams 120, 120' of printing fluid, their respective ink nozzles 116, 116', extractors 22', 122, jets of gas 128, 128', and director nozzles 126, 126'. All of the diverters 18, 18', 118, 118' are in a non-diverting state—i.e., they are not emitting jets of gas and are therefore not diverting any of the extracted printing fluid from any of the streams of printing fluid.

In FIG. 4, the first diverter 18 and the third diverter 118 are in a diverting state—i.e., they are emitting jets of gas in the x-direction (out of the page) and diverting the first and third streams 22, 122 of printing fluid so that those streams of printing fluid are not deposited on the printing surface. Notably, all of the four streams of printing fluid continue to be extracted and directed toward the printing surface even when one or more of the diverters are in the on condition or the diverting state. The net electrostatic field along the face of the print head 10 as a function of time can therefore be held constant, thereby improving printing accuracy and permitting a construction with high ink nozzle density. The diverters are individually controllable and can be used to define the printed pattern, even when extraction and direction of the printing fluid from the multiple nozzles is synchronized. In the illustrated example, discontinuities are formed in the lines of printing associated with the first and third ink nozzles 16, 116 while the diverters are in the states illustrated in FIG. 4.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. An electrohydrodynamic printer, comprising:

an ink nozzle; and an extractor configured to use a controllable electric field to extract printing fluid from the ink nozzle for deposition on a printing surface when the printing fluid and extractor are at different electrical potentials, wherein the extractor is a self-cleaning extractor having a layer of cleaning fluid flowing along a surface of the extractor during printing.

2. The printer of claim 1, wherein the extractor comprises a metal block.

3. The printer of claim 1, wherein the extractor is a metal rod.

4. The printer of claim 1, wherein the cleaning fluid is a liquid.

5. The printer of claim 1, wherein said surface forms a non-zero angle with respect to horizontal such that the layer of cleaning fluid flows downward and away from a working end of the extractor.

6. The printer of claim 1, wherein an angle of said surface with respect to horizontal is adjustable.

7. The printer of claim 1, wherein said surface is a downward facing surface.

8. The printer of claim 1, further comprising a source of cleaning fluid and a collector, wherein the layer of cleaning fluid flows from the source to the collector.

9. The printer of claim 8, wherein the layer of cleaning fluid flows along said surface from the source to the collector.

10. The printer of claim 1, further comprising a gas-over-liquid dispensing system that dispenses the layer of cleaning fluid on the extractor.

11. A method comprising the step of cleaning the extractor of the electrohydrodynamic printer of claim 1 during printing.

12. The method of claim 11, wherein the extractor comprises a metal block.

13. The method of claim 11, wherein the extractor is a metal rod.

14. The method of claim 11, further comprising the step of causing the layer of cleaning fluid to flow along a surface of the extractor.

15. The method of claim 14, wherein the cleaning fluid is a liquid.

16. The method of claim 14, wherein said surface forms a non-zero angle with respect to horizontal such that the layer of cleaning fluid flows downward and away from a working end of the extractor.

17. The method of claim 14, wherein an angle of said surface with respect to horizontal is adjustable.

18. The method of claim 14, wherein said surface is a downward facing surface.

19. The method of claim 11, further comprising the step of dispensing cleaning fluid on the extractor using a gas-over-liquid dispensing system.

* * * * *